United States Defensive Publication [19] (H) [11] T953,001

Hendy [43] Dec. 7, 1976

[54] NATURALLY DEGRADABLE ACRYLONITRILE AND METHACRYLONITRILE POLYMERS

[76] Inventor: Brian Norman Hendy, 25, Robbery Bottom Lane, Mardley Hill, Welwyn, Hertfordshire, England

[21] Appl. No.: 597,983

[22] Filed: July 22, 1975

Related U.S. Application Data

[63] Continuation of Ser. No. 485,279, July 2, 1974, abandoned

[30] Foreign Application Priority Data

July 26, 1973 United Kingdom ..... 35647/73

[51] Int. Cl.[2] ..... C08F 220/42

[52] U.S. Cl. ..... 260/63 N

[57] ABSTRACT

A uniform copolymer containing 50 to 98% molar of acrylonitrile units or 50 to 99.5% molar of methacrylonitrile units suitable for making naturally degradable articles (wrappings, bottles) which contains as at least one copolymerized component thereof 0.1 to 25% molar of uniformly distributed units of an ethylenically unsaturated ketone of specified formula.

7 Claims, No Sheets Drawing.

18 Pages Specification

The file of this unexamined application may be inspected and copies thereof may be purchased (849 O.G. 1221, Apr. 9, 1968)